United States Patent
Dittmer et al.

(10) Patent No.: US 6,541,947 B1
(45) Date of Patent: Apr. 1, 2003

(54) STEP-DOWN CONSTANT-CURRENT TRANSFORMER

(75) Inventors: Bernd Dittmer, Ludwigsburg-Ossweil (DE); Roman Gronbach, Korntal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/786,904

(22) PCT Filed: Sep. 4, 1999

(86) PCT No.: PCT/DE99/02810

§ 371 (c)(1), (2), (4) Date: Jun. 18, 2001

(87) PCT Pub. No.: WO00/16469

PCT Pub. Date: Mar. 23, 2000

(30) Foreign Application Priority Data

Sep. 10, 1998 (DE) .......................................... 198 41 341

(51) Int. Cl.[7] .................................................. G05F 1/40

(52) U.S. Cl. ........................ 323/284; 323/222; 323/224; 323/225; 323/282; 323/285

(58) Field of Search ................................. 323/282, 284, 323/285, 222, 224, 225

(56) References Cited

U.S. PATENT DOCUMENTS

| | | | |
|---|---|---|---|
| 4,672,303 A | | 6/1987 | Newton |
| 5,430,366 A | | 7/1995 | Erckert et al. |
| 5,479,089 A | | 12/1995 | Lee |
| 5,731,694 A | | 3/1998 | Wilcox et al. |
| 5,912,552 A | * | 6/1999 | Tateishi ...................... 323/285 |
| 5,994,885 A | * | 11/1999 | Wilcox et al. ............... 323/285 |
| 6,307,356 B1 | * | 10/2001 | Dwelley ...................... 323/282 |
| 6,396,252 B1 | * | 5/2002 | Culpepper et al. .......... 323/225 |

FOREIGN PATENT DOCUMENTS

| | | |
|---|---|---|
| DE | 196 25 844 | 1/1997 |
| EP | 0 736 959 | 10/1996 |
| EP | 0 765 021 | 3/1997 |
| JP | 7-7928 | 1/1995 |
| JP | 7-194107 | 7/1995 |

OTHER PUBLICATIONS

Bruce Moore, "Synchroneous Rectification Aids Low–voltage Power Supplies", Electrical Design News, vol. 40, No. 9, Apr. 27, 1995, pp. 127–136, XP000519146, p. 129, col. 1, line 47—p. 130, col. 2, line 21*.

Barry Arbetter et al., "DC–DC Converter Design for Battery–Operated Ssytems", IEEE, Jun. 12, 1995, pp. 103–109, XP000548393, p. 104, col. 1, line 38—col. 2, line 2; figure 3*.

(List continued on next page.)

*Primary Examiner*—Michael Sherry
*Assistant Examiner*—Gary L. Laxton
(74) *Attorney, Agent, or Firm*—Kenyon & Kenyon

(57) ABSTRACT

A step-down constant-current transformer including a controllable switch downstream from the one input and connected in series to a choke, a capacitor connected in parallel at the output, and upstream from the choke, a second controllable switch in parallel. Both controlled switches are MOSFET transistors. A control unit, in particular a pulse-width control unit, is provided for the MOSFET transistors. The voltage across the parallel-connected MOSFET transistor is monitored to determine whether a reverse current, i.e., a current flowing through the choke from the output in the direction of the input of the constant-current transformer, or an electric potential at the center tap of the half-bridge formed by the two MOSFET transistors is detected. For this purpose, a comparator and an AND circuit are provided, which, in the event of such a reverse current, block the parallel-connected MOSFET transistor to prevent the reverse current.

12 Claims, 2 Drawing Sheets

OTHER PUBLICATIONS

Jeffrey D. Sherman et al., "Synchronous Rectification: Improving the efficiency of Buck Converters", EDN, Mar. 14, 1996, pp. 111–118, XP000592125, figure 5*.

Halbleiter–Schaltungstechnik (Semiconductor–Circuit Engineering), Chapter 18.6.1, pp. 563–566, by U. Tietze and Ch. Schenck, Springer–Verlag, 9, Ed. 1989** No month.

* cited by examiner

STEP-DOWN CONSTANT-CURRENT TRANSFORMER

BACKGROUND INFORMATION

The present invention relates to a step-down constant-current transformer, including a controllable switch downstream in outgoing circuit from the one input and connected in series to a choke, and a capacitor connected in parallel at the output, of the species defined in the first part claim 1.

A step-down constant-current transformer including a controllable switch downstream from the one input, connected in series to a choke inductor, and a capacitor connected in parallel at the output, is known from the book "Halbleiter-Schaltungstechnik" (Semiconductor-Circuit Engineering) chapter 18.6.1, pp. 563–566, by U. Tietze and Ch. Schenck, Springer-Verlag publishers, 9, ed. 1989, a free-wheeling diode being provided in parallel, upstream in incoming circuit from the choke. The step-down constant-current transformer is used for converting an input d.c. voltage into another, lower output d.c. voltage. Due to its simple construction and high level of efficiency, this transformer is preferably used in motor vehicles. One difficulty with these known step-down constant-current transformers is the so-called gap interrupted operation, when the output current is smaller than half of the average load current.

This problem occurs particularly in the case of step-down constant-current transformers, where the parallel-connected free-wheeling diode is replaced by a controllable switch to increase the efficiency level and to form a synchronous rectifier. In the case of transformers having synchronous rectifiers, reverse currents occur occasionally, which flow from the output in the direction of the input, through the choke, and also discharge the output capacitor. As such, this causes the efficiency level to deteriorate and the output ripple to increase. Such an arrangement is known to the applicant as internal related art within the company, but cannot be verified in print.

To avoid reverse currents caused by the synchronous rectifier, it is possible to switch off the synchronous rectifier during reverse current flow. However, for this purpose, it is necessary to detect the current direction. The current direction can be conventionally detected by measuring the current, e.g. using a shunt or a current transformer. However, in this case, a reduction of the output signal range may be unavoidable, since the measuring amplifier indicates the positive and the negative current range. This is particularly disadvantageous for circuits that are operated using a unipolar voltage supply in motor vehicles, for example.

The object of the circuit configuration in accordance with the present invention is to reliably and inexpensively detect current direction without the stated disadvantages and to prevent reverse currents in step-down constant-current transformers.

SUMMARY OF THE INVENTION

The step-down constant-current transformer configured in accordance with the present invention has the advantage of ensuring the detection of an occurrence of a reverse current using simple means and of creating the opportunity to prevent or stop the flow of this reverse current.

According to the present invention, this is principally achieved in that, instead of the free-wheeling diode for forming a "synchronous rectifier" connected in parallel, upstream from the choke, a second controllable switch is provided; both controllable switches are made of MOSFET transistors; a control unit, in particular a pulse-width control unit, is provided for the MOSFET transistors; the voltage across the parallel-connected MOSFET transistor is monitored to determine whether a reverse current, i.e., a current flowing through the choke from the output in the direction of the input of the constant-current transformer, or, as the case may be, the electric potential at the center tap of the half-bridge formed by the two MOSFET transistors is detected; and in that in the event of such a reverse current, the parallel-connected MOSFET transistor is blocked to prevent the reverse current.

As a result of measures set forth in the additional claims, preferred further refinements and embodiments, as well as improvements of the step-down constant-current transformer recited in claim 1 are possible.

In a particularly effective embodiment of the present invention, for detecting voltage, a comparator is provided that compares the electric potentials at the drain terminal and source terminal of the parallel MOSFET transistor to one another and then produces a controlling output signal when the electric potential is higher at the drain terminal than at the source terminal, which is preferably at zero potential.

According to an advantageous further refinement of this practical embodiment of the present invention, an enabling logic is provided for the synchronous rectifier by which the output signal of the comparator is combined with the output signal from the control unit intended for the gate of the MOSFET transistor arranged in parallel. In a simple embodiment, the enabling logic is an AND circuit to which the gate control signal for the gate of the parallel MOSFET transistor and the output signal of the comparator are supplied as input signals.

In an additional advantageous embodiment, an operational amplifier or a comparing element is provided as the comparator to which, at the inverting input, the electric potential at the drain terminal of the parallel MOSFET transistor, and, at the non-inverting input, the electric potential of the source terminal at zero potential of the parallel MOSFET transistor is supplied.

In an advantageous embodiment and improvement of this exemplary embodiment of the present invention, the output signal of the comparator is stored in a storage element, in particular a microcontroller, and is also made available for additional application purposes. As such, diagnostic purposes, for example, can be satisfied and system conditions can be determined.

In an additional improvement of this exemplary embodiment, a capacitor between the positive input and the zero potential is provided in parallel upstream from the controllable, series-connected MOSFET transistor. As a result of this input capacitor, the input d.c. voltage is smoothed and overvoltage protection is achieved.

The constant-current transformer configured in accordance with the present invention is particularly advantageously used in a parallel connection of a plurality of power modules. Corresponding to a further particularly advantageous application, the constant-current transformer is used for forming interleaved buck converters, where the individual power modules are controlled in a phase-displaced manner.

BRIEF DESCRIPTION OF THE DRAWING

Based on one of the exemplary embodiments represented in the drawing, the present invention is more closely explained in the following description. The figures show.

DESCRIPTION OF THE EXEMPLARY EMBODIMENT

Figure 1:
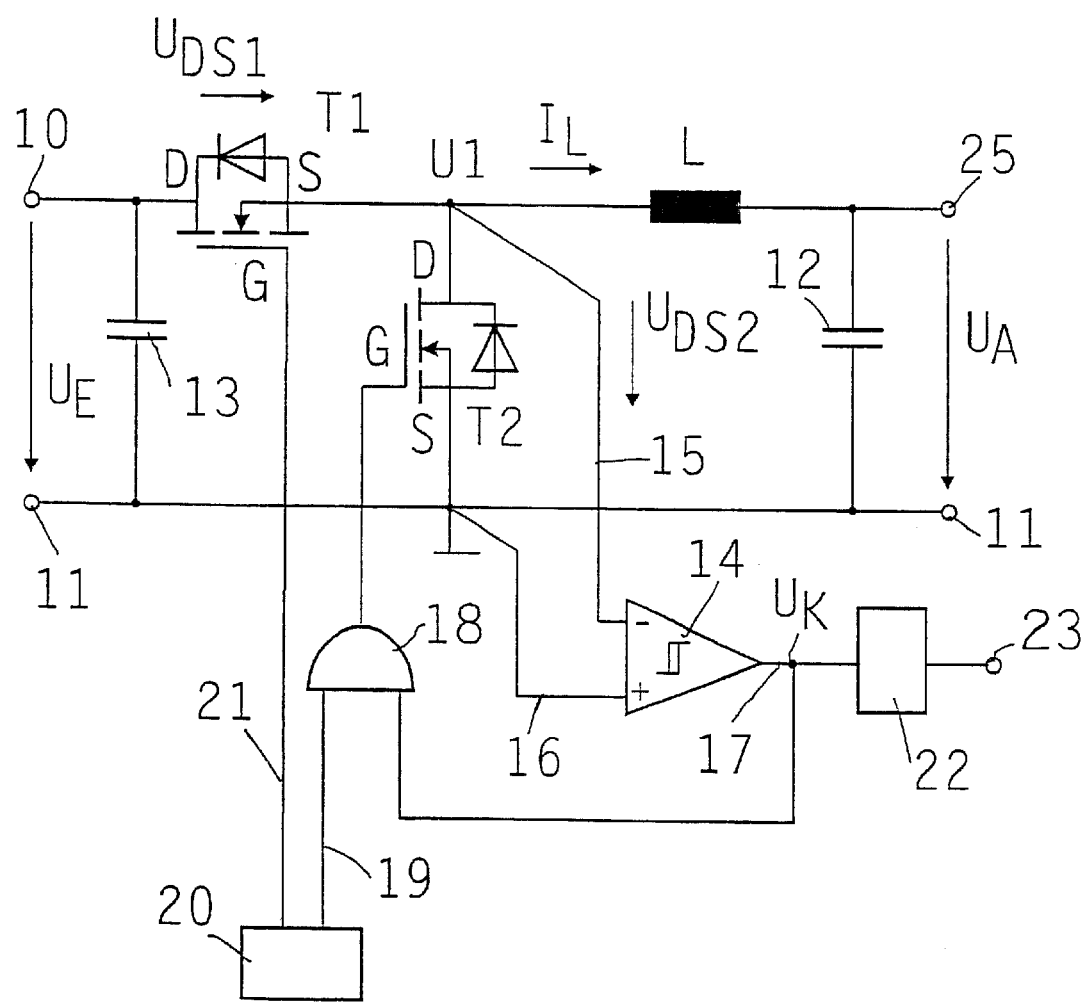
FIG. 1 a schematic basic circuit diagram of the exemplary embodiment of the step-down constant-current transformer according to the present invention having a synchronous rectifier and means of detecting reverse currents.

An exemplary embodiment is represented in FIG. 1 based on the schematic basic circuit diagram. The step-down constant-current transformer configured in accordance with the present invention includes a controllable switch T1 connected in series to a choke L. The series arm extends between first input 10 and an output 25. An input d.c. voltage $U_e$ is applied between first input 10 and second input 11. This input d.c. voltage $U_e$ can be the battery voltage of a motor vehicle, for example. Second input 11 is set to zero potential, for example, and also forms the second output pole in the represented exemplary embodiment. An output d.c. voltage $U_A$ is applied between output 25 and pole 11, across intermediate capacitor 12, which is provided in parallel at output 25 and is also referred to as output capacitor. A second controllable switch T2 is provided in parallel upstream from choke L. Furthermore, a capacitor 13, also referred to as the input capacitor, is provided in parallel upstream from first controllable switch T1. Capacitor 13 satisfies smoothing and protective functions.

Both controllable switches T1 and T2 are transistors, especially MOSFET transistors. The transmission characteristic of such MOSFET transistors is essentially the same in both current-flow directions, drain to source and source to drain. The transmission characteristic in the direction from the source to the drain is represented by the diode that represents this generally parasitic characteristic.

According to the present invention, to prevent reverse currents, i.e., currents that flow through choke L in the opposite direction of the load current or choke current $I_L$ drawn in according to arrow $I_L$, electric potential U1 is monitored at the connection point of the half-bridge formed by the two transistors T1 and T2. In other words, voltage $U_{DS2}$ is detected across the drain-source segment of transistor T2.

In correspondence with the represented exemplary embodiment, a comparator 14, which, in particular, can be an operational amplifier or a comparing element having hysteresis and connected up as a Schmitt trigger that compares the electric potential U1 at the center tap of the half-bridge formed by the two transistors T1 and T2 to the applied electric potential at shared input and output pole 11, i.e., the zero potential in the represented exemplary embodiment, is used to detect the voltage. For this purpose, the center tap having voltage U1 is connected to the inverting input (−) of comparator 14 via a line 15, and the potential of shared pole 11 is connected to the non-inverting input (+) of the comparator via a line 16. Signal $U_K$ is applied at output 17 of the comparator. This signal $U_K$ is applied when the electric potential at drain terminal D of second transistor T2, which functions as a synchronous rectifier, is higher than that of source terminal S at zero potential.

Output 17 of comparator 14 is sent to an enabling logic 18 for synchronous rectifier T2 as an input signal. An additional input signal of this enabling logic, which has a logical AND circuit 18, in particular, is the gate control signal on line 19, which is produced by a control unit 20. Control unit 20 also produces the gate control signal for series-connected transistor T1 which is supplied to Gate G of transistor T1 via a line 21. Control unit 20 is a pulse-width modulation or a pulse-frequency modulation, in particular, and as such, provides the control signals for switching the two MOSFET transistors T1 and T2 on and off. Output signal $U_K$ of comparator 14 can also be supplied via line 17 to a storage element 22, which can be made of a latch or a flip flop, for example. Thus, at output 23, this signal $U_K$ is available for diagnostic purposes and for determining system conditions, which can especially be determined with the help of a microcontroller.

Figure 3:
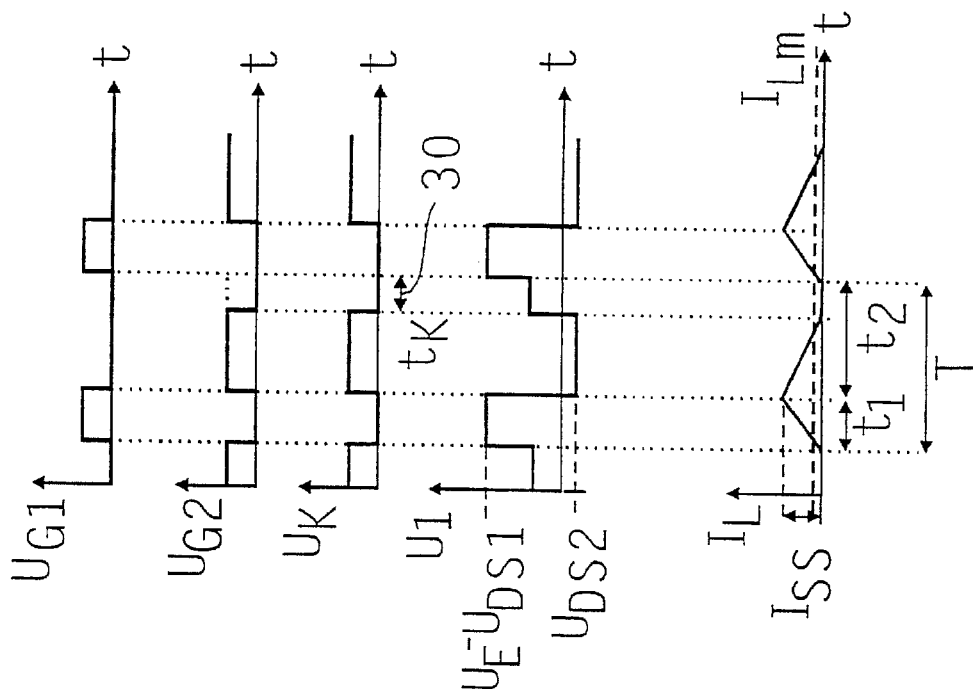
FIG. 3 a schematic view of the time characteristics of different voltages and currents in the step-down constant-current transformer according to the present invention during interrupted operation, reverse-current detection, and blocking of the parallel-connected transistor.
Figure 2:
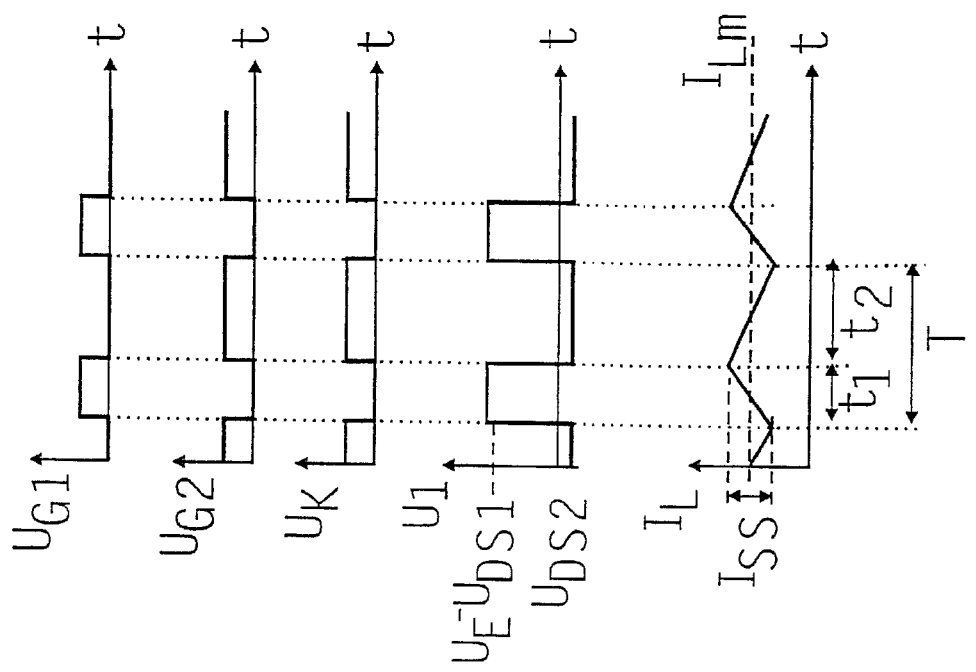
FIG. 2 a schematic view of the time characteristics of different voltages and currents in the step-down constant-current transformer according to the present invention during non-interrupted operation.

Based on the diagrams in FIGS. 2 and 3, the following more closely describes the method of operation and mode of operation of the step-down constant-current transformer configured in accordance with the present invention. FIG. 2 schematically shows the time characteristics of different voltages and currents in the step-down constant-current transformer according to the present invention during non-interrupted, normal operation, and FIG. 3 schematically shows the time characteristics of the same voltages and currents in the step-down constant-current transformer according to the present invention during interrupted operation, as well as the detection of reverse currents in accordance with the present invention and the blocking of parallel-connected transistor T2 using intermittently active comparator 14.

Diagram A represents voltage $U_{G1}$ at gate G of first, series-connected transistor T1 over time t. Diagram B represents voltage $U_{G2}$ at gate G of second, parallel-connected transistor T2 over time t. Diagram C represents output voltage $U_K$ of comparator 14 on line 17 over time t. Diagram D represents voltage U1 at the center tap of the half-bridge formed by both transistors T1 and T2 over time t. In this context, the value of U1 is the difference between input voltage UE and drain-source voltage $U_{DS1}$ of first transistor T1, $U1 = U_E - U_{DS1}$. The value for drain-source voltage $U_{DS2}$ of second transistor T2 is also recorded in this diagram. In the lowest or last diagram E, load current or choke current $I_L$ is represented over time t.

Diagram E of FIG. 2 represents the more or less triangle-shaped characteristic of load current or choke current $I_L$. In this context, using a double arrow, the span of values of peak-to-peak current $I_{SS}$, which occurs between the triangle peaks, is recorded by a dotted line, and resulting average load current $I_{LM}$ is also recorded by a dotted line. In this represented case of normal operation, the value of the load current or choke current $I_L$ does not fall below the value zero, thereby ensuring that no currents flowing in the opposite direction occur.

In opposition thereto, diagram E of FIG. 3 illustrates the case, where the load current or choke current $I_L$ in the positive range is intermittently interrupted or breaks. This is the case when the average load current or choke current $I_{LM}$ becomes smaller than half of the value of peak-to-peak current $I_{SS}$. This is recorded with a dotted line.

In diagram E of FIG. 2, the times are recorded at which first transistor T1 is switched so as to conduct, namely during $t_1$, when the gate voltage $U_{G1}$ is high, and the times at which second transistor T2 is switched so as to conduct, namely during $t_2$, when gate voltage $U_{G2}$ is high. During this normal operation, output voltage $U_K$ of the comparator is also always high when either $U_{G1}$ or $U_{G2}$ is high. In this context, voltage $U_{DS2}$ across the drain-source segment of second transistor T2 is respectively negative, as shown in FIG. 2. This voltage $U_{DS2}$ changes its sign when a reverse current begins to flow, or when the load current or choke current $I_L$ reaches the value zero from a positive value, as shown in FIG. 3. The value of voltage $U_K$ also changes from high to low, and, during time $t_K$ indicated with reference numeral 30 in FIG. 3, comparator 14 is active in such a way that the gate control signal is blocked on line 19 via AND circuit 18 so that the gate is no longer controlled by the second transistor, thus blocking the transistor. In this way, the reverse current across transistor T2, as well as the disadvantages that accompany such a reverse current are prevented.

The step-down constant-current transformer configured according to the present invention distinguishes itself by using a simple circuitry to particularly effectively prevent reverse currents. The circuitry is easy to duplicate, has minimum space requirements, and is easy to integrate. Detecting and preventing reverse currents is particularly advantageous, especially when a plurality of power modules are used in a parallel connection to increase the power output, or when using interleaved buck converters, where the individual power modules are controlled in a phase-displaced manner.

What is claimed is:

1. A step-down constant-current transformer for converting an input d.c. voltage into a lower output d.c. voltage, comprising:
    a first controllable switch, including a first MOSFET transistor, connected in series between a first input terminal and a choke;
    a capacitor connected in parallel to the first input terminal and a second input terminal;
    a second controllable switch, including a second MOSFET transistor, connected in parallel, upstream from the choke, forming a synchronous rectifier;
    a control unit driving the first and second MOSFET transistors, the control unit blocking the second MOSFET transistor upon the occurrence of a reverse current condition to prevent a reverse current;
    a comparator for detecting voltage having an output, the comparator receiving an electric potential at a drain terminal of the second MOSFET transistor at an inverting terminal and receiving an electric potential at a source terminal of the second MOSFET transistor at a non-inverting terminal and comparing the potentials received at the respective inverting and non-inverting terminals, and emitting from the output a controlling output signal indicating a reverse current condition when the electric potential at the drain terminal is higher than the electric potential at the source terminal.

2. The transformer as recited in claim 1, wherein the control unit driving the first and second MOSFET transistors is a pulse-width control unit.

3. The transformer as recited in claim 1, further comprising:
    an enabling logic gate combining the controlling output signal of the comparator with an output signal of the control unit associated with a gate of the second MOSFET transistor.

4. The transformer as recited in claim 3, wherein the enabling logic circuit includes an AND circuit, the AND circuit receiving the output signal of a control unit associated with the gate of the second MOSFET transistor and the output signal of the comparator.

5. The transformer as recited in claim 1, wherein the comparator further includes at least one of a comparing element and an operational amplifier; an inverting input, the inverting input receiving the electric potential at the drain terminal of the second MOSFET transistor; and a non-inverting input, the non-inverting input receiving the electric potential at the source terminal of the second MOSFET transistor.

6. The transformer as recited in claim 1, further comprising:
    a storage element storing the output signal of the comparator and providing the output signal for diagnostic purposes.

7. The transformer as recited in claim 6, wherein the storage element is a microcontroller.

8. The transformer as recited in claim 1, further comprising:
    a capacitor in parallel between a positive input terminal and a zero potential, upstream from the first MOSFET transistor.

9. The transformer as recited in claim 1, wherein the constant-current transformer is adapted for use in cooperation with a plurality of power modules in a parallel connection.

10. The transformer as recited in claim 1, wherein the constant-current transformer is adapted for use in forming interleaved buck converters, wherein each of a plurality of power modules are driven in a phase-displaced manner.

11. A method for detecting and preventing reverse currents in a step-down constant-current transformer, the step-down constant-current transformer being used to convert an input d.c. voltage into a lower output d.c. voltage, comprising the steps of:
    connecting a first controllable switch including a first MOSFET transistor in series between a first input terminal and a choke;
    connecting a capacitor in parallel to the first input terminal and a second input terminal;
    connecting a second controllable switch including a second MOSFET transistor in parallel, upstream from the choke, forming a synchronous rectifier;
    driving the first and second MOSFET transistors with a control unit;
    monitoring a voltage across the second MOSFET transistor for a reverse current condition, the reverse current condition being defined by measurement of an electric potential at a center tap of a half-bridge formed by the first and second MOSFET transistors at a comparator; and
    blocking the second MOSFET transistor to prevent a reverse current upon the occurrence of the reverse current condition,
    wherein the comparator receives the center tap potential at an inverting terminal.

12. The method as recited in claim 11, wherein the control unit driving the first and second MOSFET transistors is a pulse-width control unit.

* * * * *

UNITED STATES PATENT AND TRADEMARK OFFICE
CERTIFICATE OF CORRECTION

PATENT NO.   : 6,541,947 B1
DATED        : April 1, 2003
INVENTOR(S)  : Bernd Dittmer et al.

It is certified that error appears in the above-identified patent and that said Letters Patent is hereby corrected as shown below:

Column 1,
Line 5, change "BACKGROUND INFORMATION" to -- FIELD OF THE INVENTION --
Between lines 11 and 12, insert -- BACKGROUND INFORMATION --

Column 2,
Line 10, delete "in that"
Line 63, change "DRAWING" to -- DRAWINGS --
Delete lines 65 to 67

Column 3,
Line 1, change "FIG. 1 a" to -- FIG. 1 shows a --
Line 4, change "currents;" to -- currents. --
Line 5, change "FIG. 2a" to -- FIG. 2 shows a --
Line 8, change "; and" to -- . --
Line 9, change "FIG. 3 a" to -- FIG. 3 shows a --
Line 15, change "DESCRIPTION OF THE EXEMPLARY EMBODIMENT" to -- DETAILED DESCRIPTION --
Line 46, change "drawn in according to" to -- indicated by the --
Line 51, change "in correspondence with the represented exemplary embodiment, a" to -- A --
Line 54, delete "that"
Line 59, delete "is used to detect the voltage"

Column 4,
Line 3, change "which has" to -- which in particular has --
Line 4, delete "in particular"
Line 25, delete ", and"
Lines 55 and 56, change "Flowing in the opposite direction occur." to -- Flows in the opposite direction. --

Column 5,
Line 9, change "and, during time $t_k$ indicated" to -- and during time $t_k$ indicated --
Line 12, change "circuit 18 so that" to -- circuit 18. In this manner, --

UNITED STATES PATENT AND TRADEMARK OFFICE
CERTIFICATE OF CORRECTION

PATENT NO. : 6,541,947 B1
DATED : April 1, 2002
INVENTOR(S) : Bernd Dittmer et al.

It is certified that error appears in the above-identified patent and that said Letters Patent is hereby corrected as shown below:

Column 5 (cont'd),
Line 15, change "current are" to -- current, are --

Signed and Sealed this

Seventeenth Day of August, 2004

JON W. DUDAS
*Acting Director of the United States Patent and Trademark Office*